(No Model.)
J. M. ANTHONY.
PISTON PACKING.
No. 600,350. Patented Mar. 8, 1898.
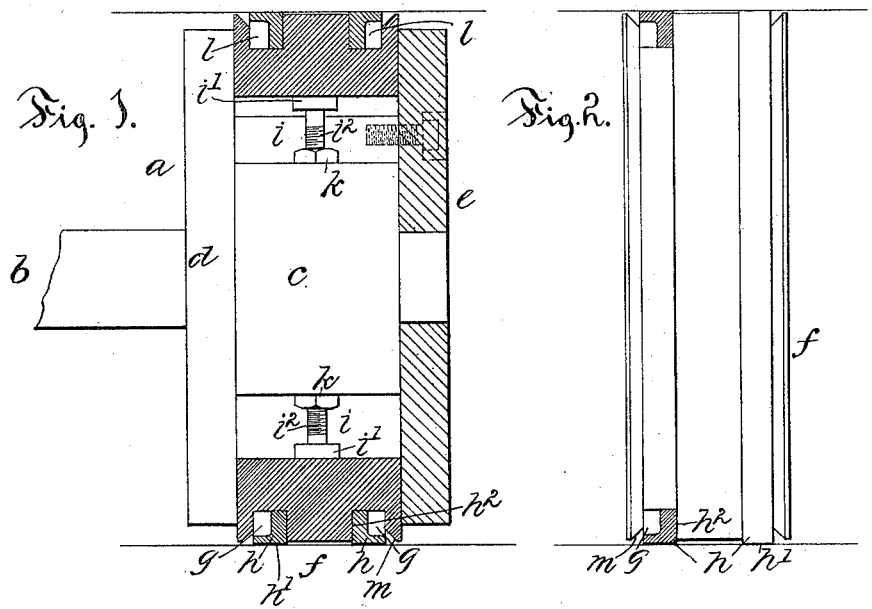
Fig. 1. Fig. 2.
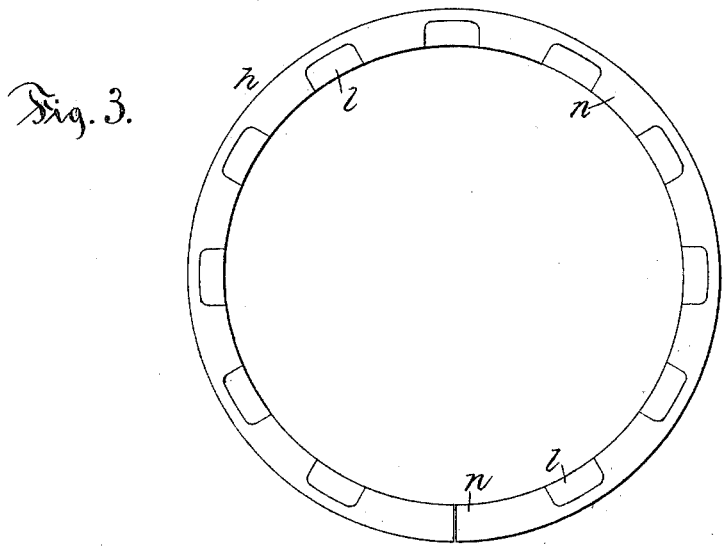
Fig. 3.
Fig. 4.
Witnesses.
H. E. Hart.
Arthur B. Jenkins
Inventor.
John M. Anthony.
by
Chas. L. Burdett
Attorney.

UNITED STATES PATENT OFFICE.

JOHN M. ANTHONY, OF HARTFORD, CONNECTICUT.

PISTON-PACKING.

SPECIFICATION forming part of Letters Patent No. 600,350, dated March 8, 1898.

Application filed February 24, 1896. Renewed January 4, 1898. Serial No. 665,598. (No model.)

*To all whom it may concern:*

Be it known that I, JOHN M. ANTHONY, a citizen of the United States, and a resident of Hartford, in the county of Hartford and State of Connecticut, have invented certain new and useful Improvements in Piston-Packings, of which the following is a full, clear, and exact description, whereby any one skilled in the art can make and use the same.

My invention relates to the class of cylindrical packings that are composed in whole or part of metallic rings supported on the piston within the cylinder of an engine and operating by the pressure of steam to secure the proper fit of the parts.

The object of my invention is to provide a self-adjusting metallic packing-ring that will not require any peculiar or odd shape of channel in the piston or in the bull-ring on the piston and one which will serve as a packing with a small expenditure of steam and possessing the required strength in all parts without undue weakening in fitting the ring to its work.

To this end my invention consists in the details of the several parts making up the packing-ring as a whole and in the combination of such ring with its supporting grooved member, as hereinafter described, and more particularly pointed out in the claims.

Referring to the drawings, Figure 1 is a detail view, in side elevation, of a piston provided with the improved ring, with parts cut away to show construction. Fig. 2 is a detail edge view of the packing-ring, with parts broken away to show construction. Fig. 3 is a detail side view of the ring. Fig. 4 is a detail view illustrating my improvement as embodied in a single ring operated by pressure from opposite faces of the piston.

In the accompanying drawings, the letter $a$ denotes a piston adapted for use in the cylinder of a steam-engine, and $b$ a piston-rod, the piston in this case having a spider $c$, with the spider-flange $d$ at one end, the other end having a removable flange which constitutes the follower $e$.

With a piston constructed with a spider of reduced diameter, as shown, a bull-ring $f$ is fitted upon the spider, between the inner faces of the spider-flange and the follower. This bull-ring $f$ is provided with circumferential grooves $g$, preferably flat at the bottom and with walls at right angles to the bottom. These grooves are adapted to receive metallic packing-rinks $h$ of special construction. The central portion of the bull-ring is slightly less in diameter than the cylinder within which it fits, and the packing-ring is of a normal diameter slightly greater than that of the bull-ring, the former, however, in its normal position fitting loosely within the cylinder. The outer bearing-surface $h'$ of the packing-ring is forced into close working contact with the inner surface of the cylinder by the expansive force of the steam within the cylinder.

When the bull-ring is in position on the piston, the latter is centered in the cylinder by means of the adjusting-screws $i$. Each of the screws $i$ has a head $i'$, adapted to thrust against the inner surface of the bull-ring, and a threaded stem $i^2$, fitting a threaded socket in the spider. A check-nut $k$, fitting on the threaded stem $i^2$, serves to lock the adjusting-screw by turning the check-nut down upon the surface of the spider in the usual manner.

The follower is held in place on the end of the piston by means of bolts or screws extending through sockets in the follower and taking into threaded sockets in the spider or an arm cast thereon.

The packing-ring $h$ is oblong in cross-section, the outer bearing-surface or periphery $h'$ being preferably of a width substantially the same as the width of the bearing-surface $h^2$, the latter resting in sliding contact with the wall of the groove in the bull-ring or in the piston in case the groove is formed therein, as is the case in some forms of the device. Each packing-ring $h$ is severed at one point in its length, so as to permit the ring to expand radially, although on the withdrawal of this pressure the spring of the metal tends to restore the ring to the smaller and normal diameter.

In order to effect the radial expansion of the ring, pressure-sockets $l$ are provided at intervals along the outer face and on the inner side—that is, the sockets open inward and forward. These sockets are preferably formed with rounded ends and slightly rounded as to the meeting surfaces, as seen in cross-section, as affording a convenient form of construction, by means of milling-tools.

The inner edge of the flange on the face of the bull-ring is preferably chamfered, as at $m$, the periphery of this flange fitting so closely to the inner surface of the cylinder as to afford but a minimum space for the passage of steam into the pressure-socket in the packing-ring. The formation of these pressure-sockets at intervals in the packing-ring enables a section $n$ of the ring to be left of normal width and thickness, and this obviates a serious difficulty in old forms of ring in which a bevel is carried completely around the ring to provide a pressure-surface for the steam. In such prior forms the ring breaks at the junction, which is frequently beveled, scarfed, or halved together to form a meeting surface.

Although my invention has been described as used in connection with a grooved bull-ring, the latter is not essential, as the grooves may be formed in the surface of a solid piston or the grooves may exist in a false ring fitting on the piston; but in any case the rectangular form of my improved ring in cross-section enables it to be adapted for use without turning down special sockets or special forms of grooves in either a piston, false ring, or bull-ring.

The operation of my device is as follows: A piston operatively fitting within a cylinder has grooves to receive the packing-ring, and the steam on either face of the piston passes between the periphery of the flange on the front side of the packing-ring groove and the inner surface of the cylinder into the pressure-socket. The pressure of the steam tends to expand the ring, and the area of the surfaces within the sockets is so proportioned to the frictional surface $h^2$ as to permit the exact degree of outward movement of the ring under the graduated pressure to force the outer bearing-surface against the inner surface of the cylinder with sufficient strength to make a steam fit without undue wear. The outer edge or periphery of the packing-ring is of sufficient thickness all around to stand considerable wear without greatly changing the proportion between the packing-surface and the back or bearing-surface of the ring.

The undercut sockets in the pressure-ring arranged in alternation with solid sections provides along the face a bearing-surface which enables a single ring to be constructed with such pressure-sockets on both faces and yet leaves a sufficient surface to form a friction-bearing for contact with the wall of the groove. By reason of this feature of improvement a single ring of this construction can be used in a cylinder which is counterbored at one or both ends. It is desirable to locate a packing-ring as near the edge of the piston as possible for the purpose of economizing steam; but in some forms of engines it is advisable to use a single ring, and the one described herein is best adapted to preserve the proper frictional bearing-surface on each face, while having the desired packing surface or periphery.

My invention has been described with reference to its use in the piston of a steam-engine, but the device is equally applicable as a packing in any vapor-engine or in pumps or similar machines in which a piston requires a tight sliding fit within a cylinder, and my device is applicable to such without any material change.

I claim as my invention—

1. In combination with a piston having a peripheral packing-groove, a split metallic packing-ring supported in the groove and having a series of undercut pressure-sockets arranged in alternation with solid portions of the ring on the side thereof and with the outer edge of the outer wall of the socket located in a plane with the sides of the solid portions of the ring and with the opening into the sockets located in a part separate from the packing-ring all substantially as described.

2. In combination with a piston having a peripheral packing-groove, a split metallic packing-ring supported in the groove and having a series of undercut pressure-sockets arranged in alternation with solid portions of the ring on the face thereof, the edge of the outer bounding wall of the sockets being located in a plane with the edge of the solid portion of the ring, the openings into the sockets being formed in a part separate from the packing-ring and the joint in the split ring being located in an otherwise solid portion thereof, all substantially as described.

3. In combination with a piston having a peripheral groove, a split metallic ring supported in the groove, and having a series of undercut pressure-sockets arranged in alternation with solid portions of the ring on the face thereof, the edge of the outer wall of the pressure-sockets being located in a plane with the edges of the solid portions of the ring, and the peripheral groove in the piston being beveled with the lower line of the beveled portions located nearer the axis of the piston than the outer wall of the pressure-sockets and the joint in split ring being located in a solid portion of the ring, all substantially as described.

4. In combination with a piston, a bull-ring supported thereon, a peripheral groove located in the bull-ring, a split metallic ring supported in the groove, and having a series of undercut pressure-sockets arranged in alternation with solid portions of the ring on the face thereof, the edges of the outer walls of the pressure-sockets being located in a plane with the solid portions of the ring, and the peripheral groove in the piston being beveled with the lower line of the beveled portions located nearer the axis of the piston than the outer wall of the pressure-sockets and the joint in split ring being located in a solid portion of the ring, all substantially as described.

JOHN M. ANTHONY.

Witnesses:
CHAS. L. BURDETT,
ARTHUR B. JENKINS.